US006967763B2

(12) United States Patent
Fujii et al.

(10) Patent No.: US 6,967,763 B2
(45) Date of Patent: Nov. 22, 2005

(54) DISPLAY DEVICE

(75) Inventors: Takamichi Fujii, Kanagawa (JP);
Akinori Harada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 58 days.

(21) Appl. No.: 10/794,025

(22) Filed: Mar. 8, 2004

(65) Prior Publication Data

US 2004/0179259 A1 Sep. 16, 2004

(30) Foreign Application Priority Data

Mar. 11, 2003 (JP) .......................... P. 2003-065579

(51) Int. Cl.[7] .......................... G02B 26/00; G09G 3/16; G09G 3/34
(52) U.S. Cl. .......................... 359/297; 359/296; 345/48; 345/84; 345/107
(58) Field of Search .......................... 345/48, 84, 107; 359/290, 291, 295, 296, 297

(56) References Cited

FOREIGN PATENT DOCUMENTS

| JP | 10-333062 A | 12/1998 |
|---|---|---|
| JP | 2001-201701 A | 7/2001 |

*Primary Examiner*—David N. Spector
(74) *Attorney, Agent, or Firm*—Sughrue Mion, PLLC (57) ABSTRACT

A display device comprises a plurality of light modulating elements being arranged in an array. In the display device, an image is displayed by driving the light modulating elements and each of the light modulating elements has a pair of substrates which are spaced apart from each other; a fluid which is enclosed in a sealed space formed by a gap between the substrates; and a driving section which deforms the fluid in the sealed space to control an area of the fluid in the sealed space, the area extending in a face of at least one of the substrates, thereby adjusting an amount of transmitted light or reflected light.

10 Claims, 8 Drawing Sheets

FIG. 6A (BRIGHT)

FIG. 6B (DARK)

FIG. 7A (BRIGHT)

FIG. 7B (DARK)

DISPLAY DEVICE

BACKGROUND OF THE INVENTION

1. Field of the Invention

The present invention relates to a display device, and more particularly to a technique of conducting a displaying process with high brightness and excellent contrast.

2. Description of the Related Art

In the related art, as a display device which displays characters, an image, and other information, known are devices such as: a liquid crystal display device in which a liquid crystal display element and polarization plates are combinedly used, and orientations of liquid crystal molecules are controlled by applying a voltage to display an image; an organic EL display device in which an organic compound that becomes self-luminous in response to application of a voltage is used for displaying an image; and an electrophoretic display device in which a colored medium is placed between electrodes, and the colored medium is electrophoresed by application of a voltage to be moved toward one of the electrodes, thereby displaying an image.

As a technique which is not used in a display device, and in which light is modulation-controlled by a fluid, a waveguide which switches light by means of movement of a liquid is known (for example, see JP-A-10-333062 and JP-A-2001-201701)

In a liquid crystal display device which uses the polarization principle, a backlight of a large amount of light is required in order to obtain sufficient white brightness. In the case where polarization plates are placed in a crossed Nicols state (black-display state), slight light leakage occurs so that complete black is not attained in the black-display and the contrast is lowered. A liquid crystal display device has further disadvantages that it shows a viewing angle dependence and is poor in visibility in an oblique direction, and that components such as a driving circuit formed on the display face do not transmit light and hence the aperture ratio is low.

In an organic EL display device, the amount of emitted light depends on the material. Therefore, it is necessary to develop a material which is sufficiently bright. However, the development involves many difficulties. Furthermore, an organic EL display device has problems such as that the amount of light is remarkably reduced by deterioration of a material and an image is unevenly displayed depending on the place.

An electrophoretic display device has problems in that a gradation display cannot be sufficiently performed, that a transmission display is principally disabled, and that the performance is lowered by aggregation of electrophoretic particles to cause a problem in durability.

These display devices cannot be used without difficulty for a display purpose in which an even image must be displayed at high brightness and high contrast. In the present circumstances, therefore, it is requested to develop a display device which can perform a high-quality display meeting such a display purpose.

With respect to the above-mentioned waveguide serving as a light modulating element which switches light, only the configuration of a single element for an optical communication apparatus is disclosed. The modulating function is directed only to a process of controlling light reflection by the refractive index of the liquid. The waveguide cannot be directly used as a display device of the transmission type or the reflection type.

SUMMARY OF THE INVENTION

The invention has been conducted in view of the above-discussed circumstances. It is an object of the invention to provide an economical display device which can display an image of high brightness and high contrast without producing color unevenness.

In order to attain the object, according to a first aspect of the invention, there is provided a display device comprising: a plurality of light modulating elements being arranged in an array, wherein an image is displayed by driving the light modulating elements; and wherein each of the light modulating elements has: a pair of substrates which are spaced apart from each other; a fluid which is enclosed in a sealed space formed by a gap between the substrates; and a driving section which deforms the fluid in the sealed space to control an area of the fluid in the sealed space, the area extending in a face of at least one of the substrates, thereby adjusting an amount of transmitted light or reflected light.

In the display device, the fluid is deformed in the sealed space to control the area of the fluid extending in the substrate face in the sealed space, thereby enabling transmitted light or reflected light to be adjusted surely and rapidly. In comparison to a liquid crystal display device, an organic EL display device, an electrophoretic display device, and the like, the present display device can display an image of high brightness and excellent contrast at a wide viewing angle and low cost without producing color unevenness. Moreover, the power consumption can be reduced. Therefore, the device can be effectively used as, for example, a display device of an electronic film viewer system for medical use which displays an X-ray image that is particularly requested to be displayed at high brightness and excellent contrast.

According to a second aspect of the invention, there is provided a display device as set forth in the first aspect of the invention, wherein the fluid is a magnetic fluid exhibiting magnetism, and the driving section includes a magnetic force generating section which generates a magnetic field in the sealed space to deform the fluid by means of a magnetic force.

In the display device, the fluid exhibiting magnetism can be deformed easily and rapidly by the magnetic force generating section so that light modulation can be smoothly performed.

According to a third aspect of the invention, there is provided a display device as set forth in the first aspect of the invention, wherein the driving section includes a piezoelectric member which is deformed by applying a voltage to change a thickness of the sealed space, thereby deforming the fluid.

In the display device, since the thickness of the sealed space is changed by the piezoelectric member, the fluid can be deformed with high responsiveness, so that high-speed light modulation is enabled.

According to a fourth aspect of the invention, there is provided a display device as set forth in any of the first to third aspects of the invention, wherein the fluid is a colored fluid containing a colored substance, and a transparent fluid which is nonmiscible in the colored fluid is enclosed in the sealed space.

According to a fifth aspect of the invention, there is provided a display device as set forth in any of the first to third aspects of the invention, wherein the fluid is a transparent fluid, and a colored fluid which is nonmiscible in the transparent fluid is enclosed in the sealed space.

In the display devices, when the fluid is a colored fluid, a transparent fluid which is nonmiscible in the colored fluid is enclosed in the sealed space, and, when the fluid is a transparent fluid, a colored fluid which is nonmiscible in the transparent fluid is enclosed in the sealed space. Therefore, the fluids can be smoothly moved, so that light modulation in the light modulation region can be performed more smoothly.

According to a sixth aspect of the invention, there is provided a display device as set forth in the fourth or fifth aspects of the invention, wherein one or both of the colored fluid and the transparent fluid is a thixotropic fluid having a property that, in a quiescent state, the fluid is solidified in a gel state, and the fluid is set to a sol state by an external force to become fluent.

In the display device, since a thixotropic fluid having a property that, in a quiescent state, the fluid is solidified in a gel state, and the fluid is set to a sol state by an external force such as vibrations to become fluent is used as both or one of the colored fluid and the transparent fluid, the speed of deformation of the colored fluid and the holding time of deformation can be easily controlled, and hence an image display of high quality can be performed.

According to a seventh aspect of the invention, there is provided a display device as set forth in any of the first to sixth aspects of the invention, wherein a backlight which emits light is disposed on a side of rear faces of the arranged light modulating elements.

The display device can be configured as a transmission type display device in which light from the backlight is transmitted toward the light modulating elements.

According to an eight aspect of the invention, there is provided a display device as set forth in any of the first to sixth aspects of the invention, wherein a reflection plate or a white diffusion plate which reflects light is disposed on a side of rear faces of the arranged light modulating elements.

In the display device, light which has been transmitted through the light modulating elements to reach the reflection plate or the white diffusion plate is returned to the light modulating elements by reflection or diffusion. Therefore, it is possible to perform a highly efficient display in which the light utilization efficiency is enhanced. Preferably, the reflection plate has a high light diffusion performance because a white display is displayed in white in a further enhanced manner as the light diffusion performance is higher. In a related-art liquid crystal display device, when a reflection plate having a high light diffusion performance is used, for example, light which has been transmitted through a polarization plate is depolarized by the reflection plate, and a sufficient display performance cannot be obtained. Since a reflection plate having a high light diffusion performance cannot be used as described above, a related-art liquid crystal display device often uses a mirror reflection plate. In this case, however, reflection occurs, and hence a white display is not displayed in white. Under these circumstances, in the display device of the invention, polarization plates are not used, and hence a reflection plate having a high light diffusion performance can be used, so that a white display is displayed in white in a further enhanced manner.

According to a ninth aspect of the invention, there is provided a display device as set forth in the seventh aspect of the invention, wherein a microlens array is disposed between the light modulating elements and the backlight, the microlens array having a plurality of microlenses which converge light from the backlight to light modulating regions of the respective light modulating elements.

In the display device, incident light can be converged by the microlenses to the light modulating regions of the light modulating elements. The light is not blocked by a portion other than the light modulating regions. Therefore, the light utilization efficiency is improved, so that a display of higher brightness can be performed.

DETAILED DESCRIPTION OF THE INVENTION

Hereinafter, preferred embodiments of the display device of the invention will be described in detail with reference to the accompanying drawings.

(First embodiment)

Figure 1:
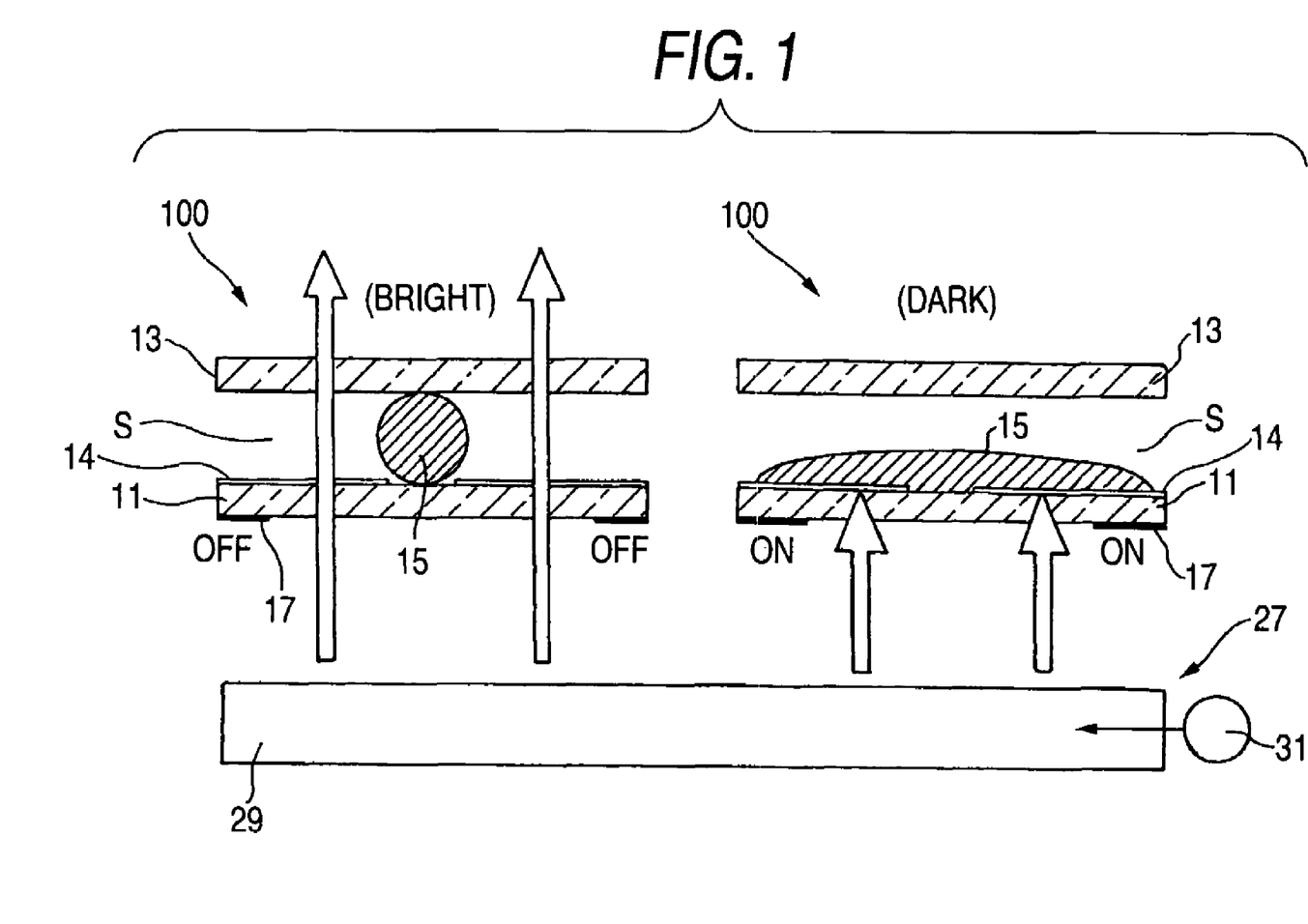
FIG. 1 is a section view of a light modulating element constituting a display device of a first embodiment of the invention.

FIG. 1 is a section view of a light modulating element constituting the display device of the invention.

The light modulating element 100 has a pair of first and second transparent substrates 11 and 13 which are opposed to each other with being separated by a predetermined distance. A colored fluid 15 which is colored in, for example, black is enclosed in a sealed space S formed by a gap between the first and second substrates 11 and 13. In the first substrate 11 over which the colored fluid 15 is to wet and spread, a water/oil repellent film 14 is formed on the surface in which a middle area is excluded, and which is used for forming the sealed space S.

As the first and second substrates 11 and 13, it is requested to use a light-transmittable material. Preferably, plastic or glass is used. Although the water/oil repellent film 14 is formed on the surface of the first substrate 11, a water/oil repellent film may be formed on the surfaces of both the first and second substrates 11 and 13, in order to prevent the colored fluid 15 from being unmoved from or remaining on the surfaces when the colored fluid 15 is to be returned to the original position after deformation.

A thin film electromagnet (magnetic force generating section) 17 serving as a driving section which moves the colored fluid 15 is disposed on the periphery of the first substrate 11. In the ON state, the thin film electromagnet 17 generates a magnetic field in the sealed space S so that the colored fluid 15 is attracted to the periphery by a magnetic force due to the field. As a result, as in the light modulating element 100 in the light transmitting state (the right side of the figure), the colored fluid 15 spreads over the surface of the first substrate 11. When the thin film electromagnet 17 is set to the OFF state, the colored fluid 15 is formed into a substantially spherical shape in the sealed space S by the surface tension as in the light modulating element 100 in the light blocking state (the left side of the figure).

The thin film electromagnet 17 has a structure in which electromagnetic yokes are disposed respectively on the front and rear faces of a planar coil, and the upper and lower electromagnetic yokes are coupled to each other in a contact portion. Each of the electromagnetic yokes is formed by a thin film of soft magnetizable material such as Fe—N, Co—Zr—Nb, Fe—Ni, or Fe—Si, and the planar coil is formed by a thin film of copper, aluminum, or the like (for example, see JP-A-2000-235152).

A backlight 27 is disposed on the side of the rear face of the light modulating element 100 which is on the light incidence side. The backlight 27 has a waveguide 29 which extends along the rear face of the light modulating element 100, and a light source 31 which is placed on an end face of the waveguide 29. Light emitted from the light source 31 is introduced into the light modulating element 100 while being totally reflected and guided in the waveguide 29.

Next, the specific configuration of portions of the light modulating element 100 will be described in detail.

The colored fluid 15 can be preferably produced in the following manner. An aqueous emulsion of magnetic fine particles with higher fatty acid salt being adsorbed thereon, and an organic solvent solution of a hardly water soluble surfactant are subjected to an ultrasonic treatment to cause the surfactant to be adsorbed on the magnetic fine particles. The particles are then dispersed in a base oil such as aromatic hydrocarbons (e.g., toluene), higher alkylbenzenes, higher alkylnaphthalenes, polybutene and dicarboxylic acid esters.

As the magnetic fine particles in the colored fluid 15, fine particles of ferrites are usually used. Fine particles of ferrites produced by any method are useful. Preferably, fine particles of ferrites produced by the coprecipitation method which is advantageous in purity, particle size, and productivity are used. Preferred examples of such ferrites are magnetite, nickel ferrite, manganese ferrite, cobalt ferrite, nickel-zinc ferrite, and manganese-zinc ferrite. Other kinds of particles such as particles of metals such as iron, manganese, nickel, and cobalt, and those of borides, nitrides, carbides, and other compounds of the metals are useful (for example, see JP-A-2001-167919).

The colored fluid 15 in which the density of the magnetic fine particles is in a range of about 3 to 70 wt. % is preferably used. As an anion of the fatty acid salt being adsorbed on the magnetic fine particles, a fatty acid anion having 10 to 30 carbon atoms is usually employed. Specific examples of the fatty acid anion are higher fatty acid anions such as oleic acid anion, stearic acid anion, linolic acid anion, linolenic acid anion, erucic acid anion, myristic acid anion, and behenic acid anion (for example, see JP-A-8-259986). Specific examples of a cation of the fatty acid salt are potassium, sodium, lithium, magnesium, calcium, quaternary ammonium compounds (e.g., tetraalkylammonium and 1-alkylpyridinium) or the like.

The magnetic fine particles can be prepared in the following manner. First, an aqueous solution of a salt of such a higher fatty acid is added to an aqueous dispersion of magnetic fine particles. Under stirring conditions, the dispersion is then subjected to an adsorption treatment at from room temperature to about 90° C. for about 0.5 to 2 hours, whereby fine particles of ferrites covered with the higher fatty acid salt are formed.

The magnetic fine particles on which a higher fatty acid salt is adsorbed have a hydrophobic surface, and hence can be dispersed in an organic solvent. As the organic solvent, useful are: aliphatic hydrocarbons such as n-hexane, n-octane, isooctane, n-decane, n-dodecane, and n-hexadecane; aromatic hydrocarbons such as toluene, xylene, and dodecylbenzene; halogenated hydrocarbons such as chloroform, carbon tetrachloride, and chlorobenzen; and ethers such as tetrahydrofuran.

Magnetic fine particles which are prepared in an aqueous solution are highly hydrophilic. Therefore, such particles cannot be dispersed in an organic solvent, and instead aggregate in such a solvent. By contrast, when a water soluble surfactant (higher fatty acid salt) is adsorbed on such fine particles, the fine particles exhibit hydrophobicity, and can be dispersed in various kinds of solvents such as those exemplified above. As a result, the fine particles can be subjected to a treatment using an oil soluble surfactant (hardly water soluble surfactant).

Examples of materials useful as the colored fluid 15 are: an ink material disclosed in "Purinta zairyo no kaihatsu", supervised by TAKAHASHI Kyosuke and IRIE Masahiro, Kabushiki Kaisha CMC; an ink disclosed in JP-A2002-137399; a pigment dispersion which is disclosed in JP-A-2002-294133, and in which a pigment, a surfactant, and a crosslinkable resin are blended into an aqueous medium; an aqueous pigment dispersion disclosed in JP-A-2001-11341; a hydrophobic dye which is disclosed in JP-A-2002-241649, and which is enclosed in at least a hydrophilic resin; an aqueous organic; and a polymer coloring material disclosed in JP-A-10-60344. A liquid material may be encapsulated in a microcapsule as disclosed in, for example, JP-A-48-97773.

As the water/oil repellent film 14 formed on the surface of the first substrate 11, a water repellent silicon oxide film containing an organic silicon compound composed of an organosilane which does not contain fluorine can be used.

In a reaction product of an organosilane due to low-temperature plasma, a low surface energy is obtained, and hence a feature that water repellency is improved is provided. In a water repellent silicon oxide film, preferably, an organosilane is at least one of tetramethylsilane, trimethylmethoxysilane, dimethyldimethoxysilane, hexamethyldisilane, and hexamethyldisiloxane. These organosilanes have a high vapor pressure, and hence are volatile. As a result, a source gas can be stably supplied without heating the gas or using a carrier gas or the like. Such an organosilane is easy to handle because of its relatively excellent safety, and economical. Therefore, the cost for growing a film can be reduced (for example, see JP-A-11-263860).

In addition, as the water/oil repellent film 14, a water/oil repellent agent or a composition containing the water/oil repellent agent can be used. Examples of materials useful as a water/oil repellent agent are fluorinated pitch and a fluororesin. Specifically, useful are polytetrafluoroethylene, tetraethylenehexafluoropropylene copolymer, ethylenetetrafluoroethylene copolymer, tetrafluoroethyleneperfluoroalkylvinylether copolymer, polyvinylidene fluoride, and polyvinyl fluoride, a fluororesin coating agent based on such a material, and a fluorine containing compound having a fluorocarbon group, or a fluororesin coating agent based on such a material (for example, see JP-A-2001-254030).

Other components constituting the water/oil repellent agent composition containing the water/oil repellent agent are not particularly restricted, and may be materials other than a water/oil repellent agent such as an existing resin, rubber, an aqueous or oily liquid medium, various kinds of powders, or a mixture thereof.

Examples of the other components are: thermoplastic resins such as polyethylene, polypropylene, polystyrene, polymethylmethacrylate, polyvinyl chloride, polyvinyl acetate, polycarbonate, an ABS resin, an AS resin, an AES resin, polyamide 6, polyamide 66, polyetherimide, polyetheretherketone, polyphenylene oxide, PTFE, FEP, PFA, ETFE, PVDF, silicone, and wax, derivatives thereof, and copolymers containing them; and thermosetting resins such as an epoxy resin, a phenol resin, polyimide, polyurethane, a melamine resin, a urea resin, a polyester resin, and an unsaturated polyester resin, and derivatives thereof.

In preparation of a composition containing a thermoplastic resin and a water/oil repellent agent, when these materials are molded after melt-kneading or molded/dried after mixing in a solution, the water/oil repellent agent which has a relatively small surface energy is unevenly distributed or mainly exists in the vicinity of a surface layer of the molded piece. Even when the addition amount is small, therefore, water/oil repellency can be efficiently provided to the whole surface of the molded piece.

A composition containing a thermosetting resin and a water/oil repellent agent can be prepared by previously mixing a thermosetting resin precursor or polymer with the water/oil repellent agent, and then polymerizing/curing the mixture (for example, see JP-A-2002-88349).

In the case where a PTFE porous film is used as the water/oil repellent film 14, when a sputter etching treatment is applied to the PTFE porous film, the porous film can be provided with more excellent water repellency.

The function of the thus configured light modulating element 100 will be described.

In the light modulating element 100, when the thin film electromagnet 17 is turned ON, the colored fluid 15 is caused by the magnetic force to wet and spread over the surface of the first substrate 11 in the sealed space S, and the light of the backlight 27 is blocked by the colored fluid 15 (the state of the light modulating element in the right side of FIG. 1).

By contrast, when the thin film electromagnet 17 is turned OFF, the colored fluid 15 is formed into a substantially spherical shape in the sealed space S by the surface tension of the fluid itself, and collects on the middle area where the water/oil repellent film 14 is not formed. As a result, the light of the backlight 27 is transmitted through the first and second substrates 11 and 13 toward the light emission side of the light modulating element 100 to be emitted therefrom (the state of the light modulating element in the left side of FIG. 1). A part of the light modulation region of the light modulating element 100 is light-shielded by the colored fluid 15 which collects on the middle area. When a light diffusion plate or the like is placed in a front side along the optical path, however, the emission light can be equalized in the light modulation region by light transmitted through the vicinity of the middle area.

When a gradation display is to be performed, the device may be configured in the following manner. One pixel is formed by plural light modulating elements, and an area gradation display is performed. Alternatively, a gradation display may be performed by time modulation in which, for example, switching between bright and dark states is duty-controlled.

In the light modulating element 100, the force which, when the thin film electromagnet is changed from the ON state to the OFF state, causes the magnetic fluid to collect on the middle area to be formed into a substantially spherical shape is generated by the water repellency of the surface of the substrate. Alternatively, a magnetic field may be generated in the middle area so that the fluid is forcedly caused to collect on the middle area.

Figure 2:
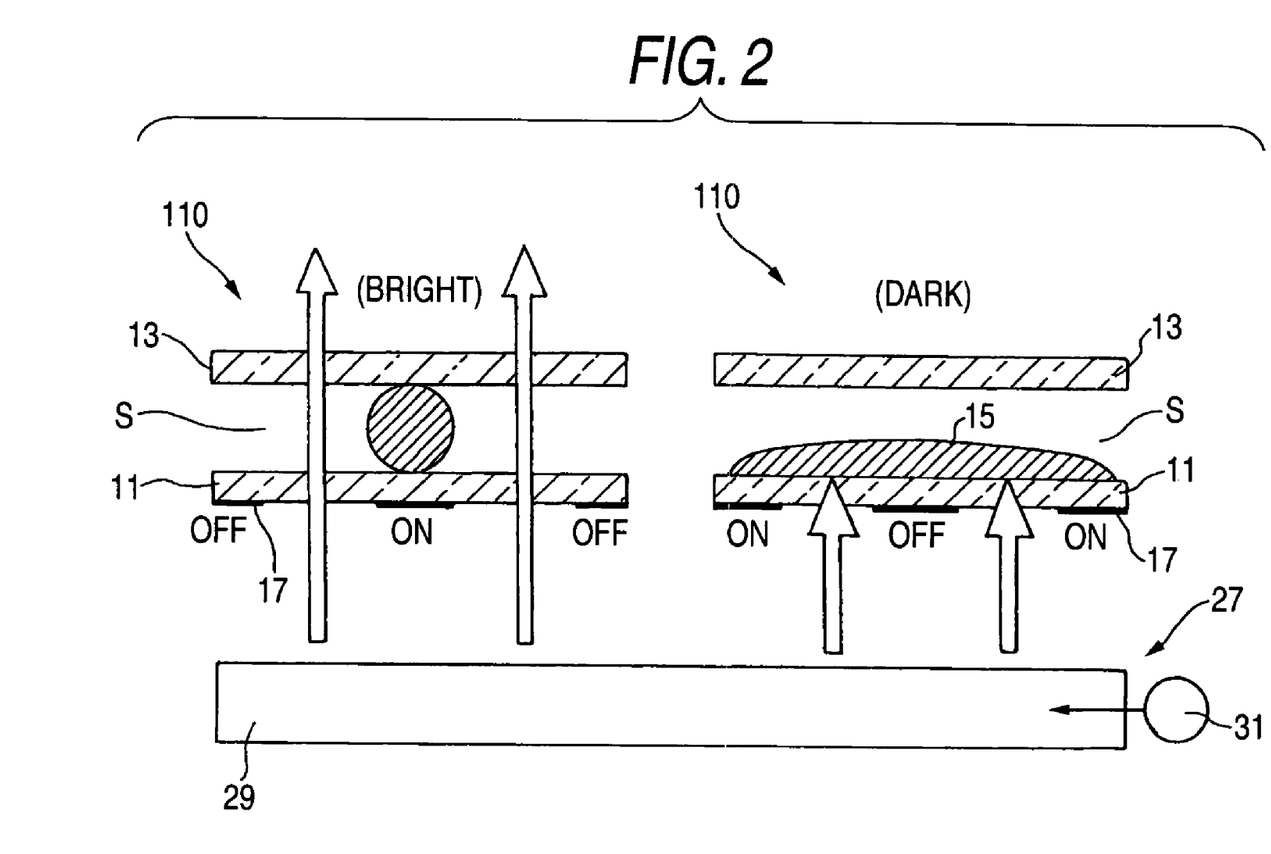
FIG. 2 is a section view showing an example of the configuration of a light modulating element in which a magnetic field is generated in a middle area.

FIG. 2 shows an example of the configuration of a light modulating element in which a magnetic field is generated in a middle area. In the light modulating element 110, when, as shown in the left side of FIG. 2, a thin film electromagnet in the middle area of the element is set to the ON state and a thin film electromagnet in the periphery of the element is set to the OFF state, a magnetic fluid collects on the middle area, so that light is emitted to the front side along the optical path. When, as shown in the right side of FIG. 2, the thin film electromagnet in the periphery of the element is set to the ON state and the thin film electromagnet in the middle area of the element is set to the OFF state, the magnetic fluid wets and spreads to establish the light-shielding state. According to the configuration, the time required for changing the display OFF state to the display ON state is shortened, and hence light modulation of a higher speed is enabled.

Figure 3:
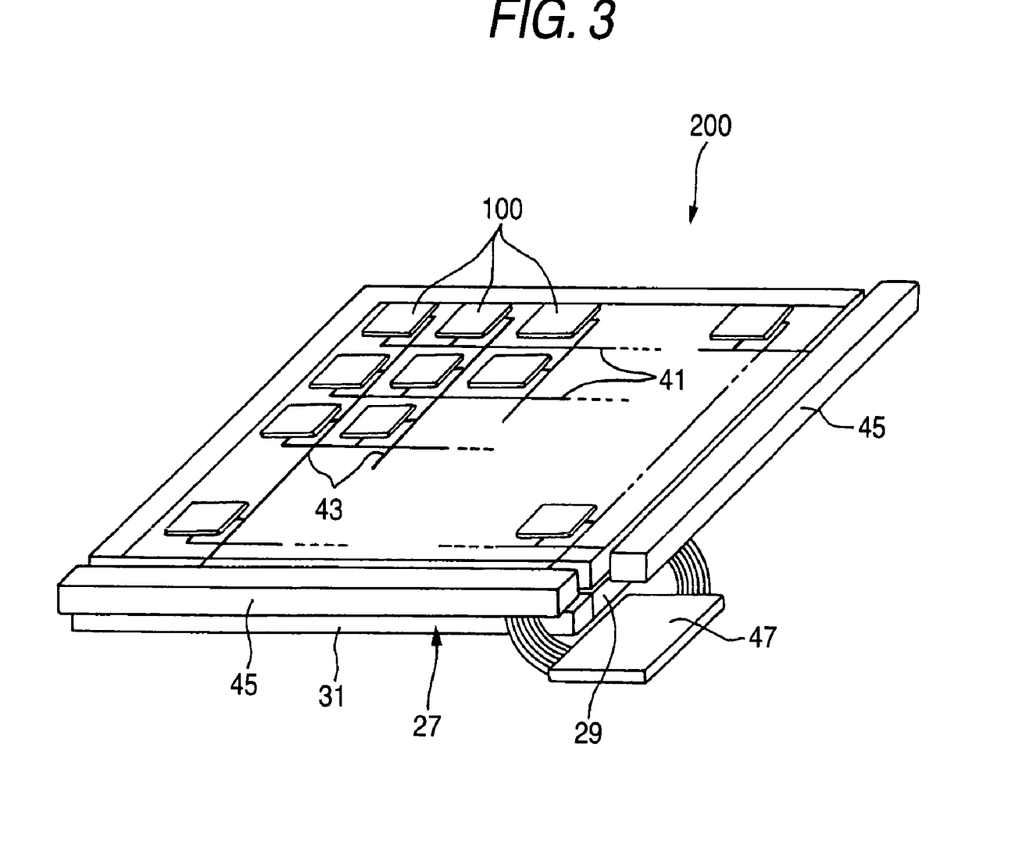
FIG. 3 is a perspective view showing the structure of a display device comprising plural light modulating elements.

A display device which is formed by arranging a plurality of the light modulating elements 100 (or 110) will be described.

FIG. 3 is a perspective view of the display device comprising the plural light modulating elements.

In the display device 200, the light modulating elements 100 are arranged in a two-dimensional array. Scanning signal lines 41 and image signal lines 43 are connected to the light modulating elements 100. The scanning signal lines 41 and the image signal lines 43 are connected to a driver circuit 47 through transferring paths 45. The driving of each light modulating element 100 is controlled by a control signal output from the driver circuit 47.

Figure 4:
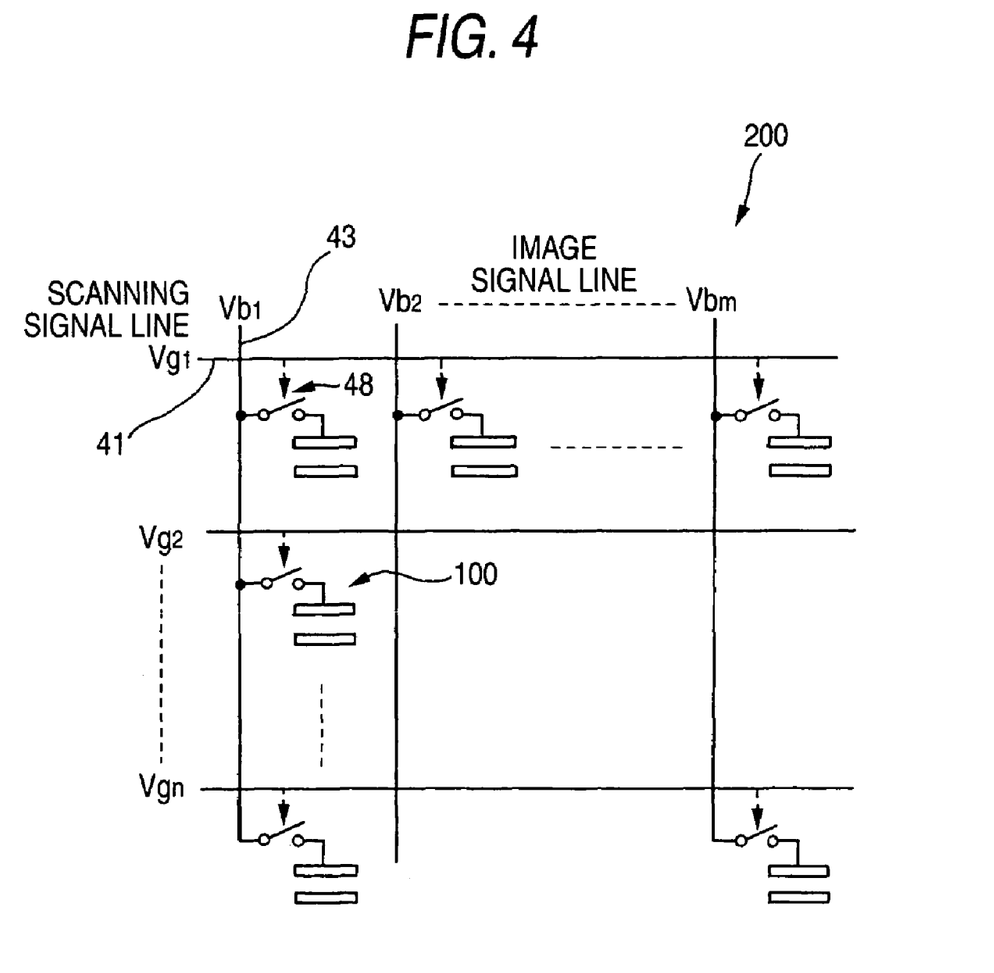
FIG. 4 is an equivalent circuit diagram of an active matrix configured by pixel driving circuits which are disposed in the light modulating elements, respectively.

When the display device 200 is to be active matrix driven, the elements are connected in the following manner.

FIG. 4 is an equivalent circuit diagram of an active matrix configured by pixel driving circuits 48 which are disposed in the light modulating elements 100, respectively. In the configuration example of an n-row×m-column active matrix, an operation voltage Vg is applied sequentially to the scanning signal lines 41 to simultaneously turn ON the pixel driving circuits 48 connected to the respective scanning signal lines. At the same time, signal voltages Vb are applied to the image signal line 43, so that charges are accumulated in electrostatic capacitances of respective pixels through the pixel driving circuits 48. Even when the operation of scanning one line is ended and the pixel driving circuits 48 become nonconductive, the aforementioned light modulating state is maintained, so that matrix modulation of plural lines is enabled. In the active matrix, preferably, at least one switching element is used for one pixel.

As described above, in the display device 200 comprising the light modulating elements 100, the colored fluid 15 is deformed in the sealed space S to control the area of the fluid extending in the face of the substrate 11 in the sealed space S, thereby adjusting the transmitted light surely and rapidly. In comparison to a liquid crystal display device, an organic EL display device, an electrophoretic display device, and the like, therefore, the display device can display an image of high brightness and excellent contrast at a wide viewing angle and low cost without producing color unevenness. Moreover, the power consumption can be reduced.

The colored fluid 15 exhibiting magnetism can be deformed easily and rapidly by the thin film electromagnet 17 serving as the magnetic force generating section so that light modulation in the light modulation region can be smoothly performed.

(Second Embodiment)

Next, a second embodiment of the display device of the invention will be described. In the following description, components having the same functions as those of the display device of the first embodiment are denoted by the identical reference numerals, and their description is omitted.

Figure 5:
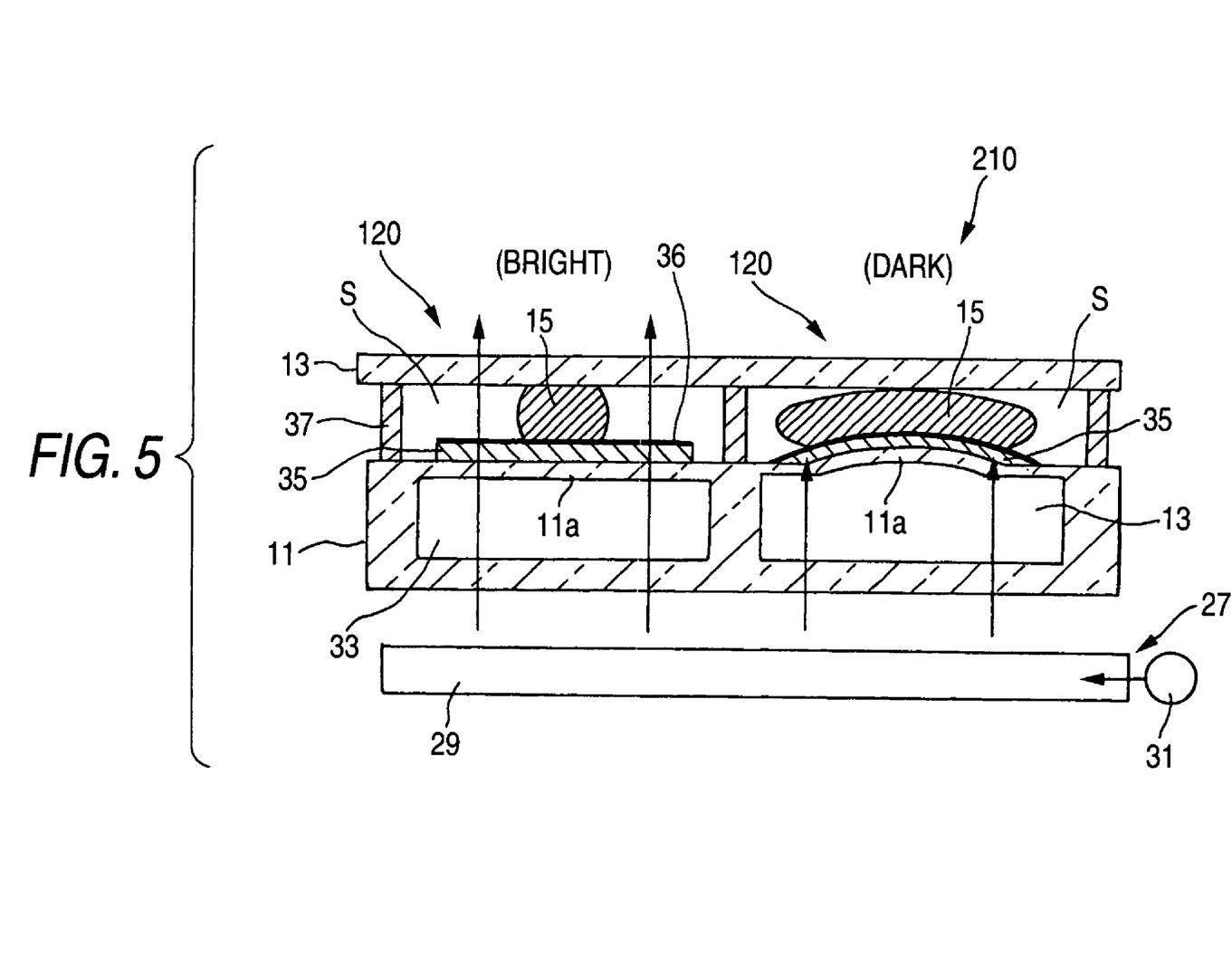
FIG. 5 is a section view of a light modulating element in a second embodiment which performs light modulation with using a piezoelectric member as a driving source.

FIG. 5 is a section view of a light modulating element which performs light modulation with using a piezoelectric member as a driving source.

In the light modulating element 120 constituting the display device 210, a void 33 is formed in the first substrate 11. A face of the void 33 which is on the display side is formed as a diaphragm portion 11a which is elastically deformable.

As a driving section which deforms the colored fluid 15, a light-transmittable piezoelectric member 35 which has a thin film-like shape is disposed on the face of the diaphragm portion 11a which is on the display side. Although not shown, in the piezoelectric member 35, the aforementioned water/oil repellent film is formed on the surface in which a middle area is excluded.

The piezoelectric member 35 is interposed between electrodes which are not shown. When a voltage is applied from the electrodes to the piezoelectric member 35, the piezoelectric member is bent so as to protrude toward the second substrate 13 in the sealed space S as in the state of the light modulating element in the right side of FIG. 5. As a result, the colored fluid 15 in the sealed space S is pressed against the second substrate 13 to wet and spread toward the outer periphery. When the voltage application to the piezoelectric member 35 is cancelled, the piezoelectric member 35 which has been bent returns to the flat shape, and the colored fluid 15 is caused to collect into a substantially spherical shape in the sealed space S by the surface tension of the fluid itself as in the state of the light modulating element in the left side of FIG. 5.

A partition wall 37 which is formed between the first and second substrates 11 and 13 by, for example, silkscreen printing separates the adjacent light modulating elements 120 from each other, so that the colored fluid 15 remains in each light modulating element 120. Namely, the sealed spaces S of the light modulating elements 120 are formed by the partition wall 37.

In the embodiment, a pigment ink, a dye ink, colored oil, or the like can be used as the colored fluid 15 enclosed between the first and second substrates 11 and 13.

Preferably, the diaphragm portion 11a of the first substrate 11 on which the piezoelectric member 35 is to be stacked is formed by a silicon single crystal substrate having a thickness of 0.1 µm or larger and 10 µm or smaller. Other preferred examples of the diaphragm portion are a silicon dioxide film, a zirconium oxide film, a tantalum oxide film, a silicon nitride film, and an aluminum oxide film. Particularly, it is preferable to form the diaphragm portion by a stacked structure of an $SiO_2$ film made of silicon dioxide ($SiO_2$) and a $ZrO_2$ film made of zirconium oxide ($ZrO_2$) formed on the $SiO_2$.

Preferably, the electrode of the piezoelectric member 35 on the side of the first substrate 11 is configured by a single layer film of iridium, or has a stacked structure composed of layers of, for example, iridium/platinum, platinum/iridium, or iridium/platinum/iridium. In the above, the layers are indicated in the sequence with starting from the side of the diaphragm portion 11a. Alternatively, the electrode may be configured by a film of an alloy of iridium and platinum, or platinum may be singly used as the electrode.

In order to enhance the adhesiveness between the diaphragm portion 11a and the lower electrode, an adequate buffer layer such as a Ti thin film of a very small thickness, or a chromium thin film may be interposed between the diaphragm portion and the lower electrode. Preferably, the thickness of the Ti thin film may be set to 10 nm or larger and 20 nm or smaller.

Preferably, the piezoelectric member 35 is a ferroelectric thin film. The piezoelectric member is preferably formed by lead titanate ($PbTiO_3$), lead zirconate ($PbZrO_3$), lead zirconate titanate ($Pb(Zr, Ti)O_3$), lead lanthanum titanate (($Pb$, $La)TiO_3$), lead magnesium niobate ($Pb(Mg, Nb)O_3$), lead zirconium lanthanum titanate (($Pb$, $La$) ($Zr$, $Ti)O_3$), $Pb(Zr, Ti) (Mg, Nb)O_3$, or the like. A composite material in which stretched and polarized polyvinylidene fluoride (PVDF) or a ceramic material is dispersed in a polymer may be used. Particularly, it is preferable to form the member by a binary system of lead titanate ($PbTiO_3$) and lead zirconate ($PbZrO_3$), or a ternary system of lead magnesium niobate ($Pb(Mg, Nb)O_3$), lead zirconate ($PbZrO_3$), and lead titanate ($PbTiO_3$).

The material of the upper electrode is not particularly restricted as far as it is a conductive material which can be usually used as an electrode. For example, the electrode may be a single layer film of Pt, $RuO_2$, Ir, $IrO_2$, or the like, or a stacked layer of two or more layers such as Pt/Ti, Pt/Ti/TiN, Pt/TiN/Pt, Ti/Pt/Ti, TiN/Pt/TiN, Pt/Ti/TiN/Ti, $RuO_2$/TiN, $IrO_2$/Ir, or $IrO_2$/TiN (for example, see JP-A-2002-43642).

The piezoelectric member 35 is produced in the following manner. A film of a piezoelectric material which is typified by lead zirconate titanate (PZT) is epitaxially grown on the electrode on the side of the first substrate 11 by the high-temperature RF sputtering method or the like. Since displacement will occur, the piezoelectric material preferably has a thickness of 5 to 30 µm. Next, a film of an electrode material to be formed as the upper electrode is grown by the RF sputtering method. Then, the electrode on the side of the second substrate 13 is formed by photolithography and the ion milling method. In consideration of the resistance and the like, the film of the electrode material preferably has a thickness of 0.1 to 1 µm (for example, see JP-A-9-94955).

As the piezoelectric member 35, aforementioned PZT which is an inorganic system is preferably used. The PZT is preferably set so as to have a large piezoelectric d constant $d_{31}$ indicative of the degree of displacement which, when an electric field is applied, is caused in a direction perpendicular to the direction of the electric field.

In the light modulating element 120, when a voltage is applied between the electrodes of the piezoelectric member 35, the piezoelectric member 35 is bent so as to protrude toward the second substrate 13, and the colored fluid 15 in the sealed space S is pressed against the second substrate 13 to wet and spread toward the outer periphery in the sealed space S. As a result, the light of the backlight 27 is blocked by the colored fluid 15 (the state of the light modulating element in the right side of FIG. 5).

When the voltage application to the piezoelectric member 35 is cancelled, the piezoelectric member 35 which has been bent returns to the flat shape, and the colored fluid 15 is formed into a substantially spherical shape in the sealed space S by the surface tension of the fluid itself to collect on the meddle area where the water/oil repellent film is not formed. As a result, without being blocked by the colored fluid 15, the light of the backlight 27 is transmitted through the first and second substrates 11 and 13 of the light modulating element 120 to be emitted therefrom (the state of the light modulating element in the left side of FIG. 5).

In the display device comprising the thus structured light modulating element 120, the thickness of the sealed space S is changed by the piezoelectric member 35, whereby the colored fluid 15 is deformed so that light modulation can be performed easily, rapidly, and smoothly.

Figure 6A:
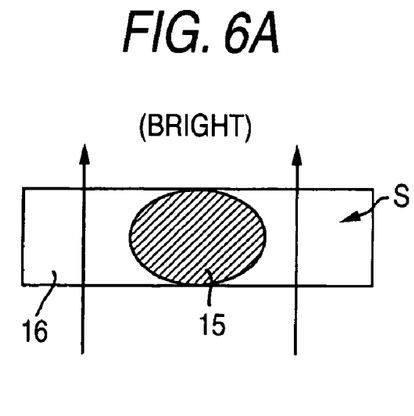
FIG. 6A is a schematic section view showing a light transmitting state, illustrating a configuration in which both a colored fluid and a transparent fluid are placed in a sealed space.
Figure 6B:
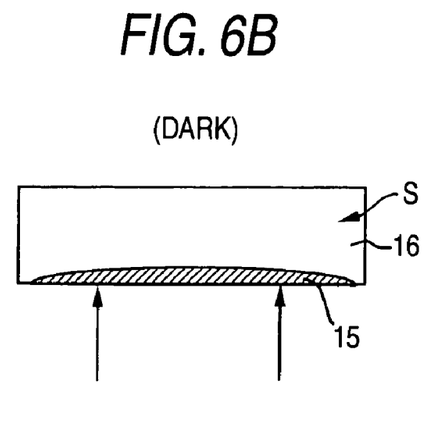
FIG. 6B is a schematic section view showing a light blocking state, illustrating a configuration in which both a colored fluid and a transparent fluid are placed in a sealed space.

Alternatively, as shown in FIGS. 6A and 6B, a transparent fluid 16 which is nonmiscible in the colored fluid 15 may be enclosed together with the colored fluid 15 in the sealed spaces S of the light modulating elements 100, 110, 120 constituting the display devices of the first and second embodiments. In the thus structured light modulating element, the deformation behavior of the colored fluid 15 is smoothened so that light modulation can be performed further smoothly.

In this alternative, a thixotropic fluid may be used as both or one of the colored fluid 15 and the transparent fluid 16. A thixotropic fluid has a property that, in a quiescent state, the fluid is solidified in a gel state, and the fluid is set to a sol state by an external force such as vibrations to become fluent. When such a thixotropic fluid is used, the speed of deformation of the colored fluid 15 and the transparent fluid, and the holding time of deformation can be easily controlled, and hence an image display of high quality can be performed.

Figure 7A:
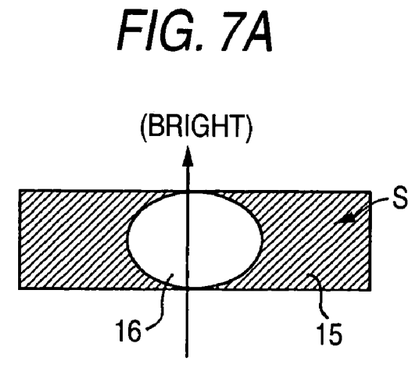
FIG. 7A is a schematic section view showing a light transmitting state, illustrating a manner of driving a transparent fluid in a configuration in which both a colored fluid and the transparent fluid are placed in a sealed space.
Figure 7B:
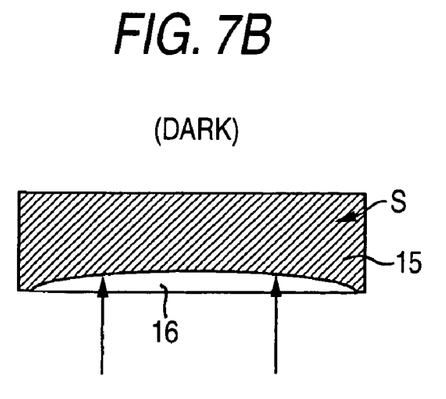
FIG. 7B is a schematic section view showing a light blocking state, illustrating a manner of driving a transparent fluid in a configuration in which both a colored fluid and the transparent fluid are placed in a sealed space.

The invention is not restricted to the configuration in which the colored fluid 15 is deformed to drive the transparent fluid 16 as described above, and may be configured in an opposite manner so that, as shown in FIGS. 7A and 7B, the colored fluid 15 is driven by deformation of the transparent fluid 16.

The display device of the first or second embodiment is configured by the flat thin backlight 27 and the light modulating element 100, 110, 120, and, in each modulating element, the amount of transmitted light is adjusted by the electromechanical shutter. In the thus structured display device, unlike an LCD device, it is not required to use polarization plates which largely attenuates the amount of light. In comparison to an LCD device, therefore, the display device can use more effectively the light from the backlight 27, or has a configuration which attains an excellent effect of low power consumption.

A structure which can use particularly effectively light will be described taking as an example the case where the light modulating element 100 of the first embodiment is used.

Figure 8:
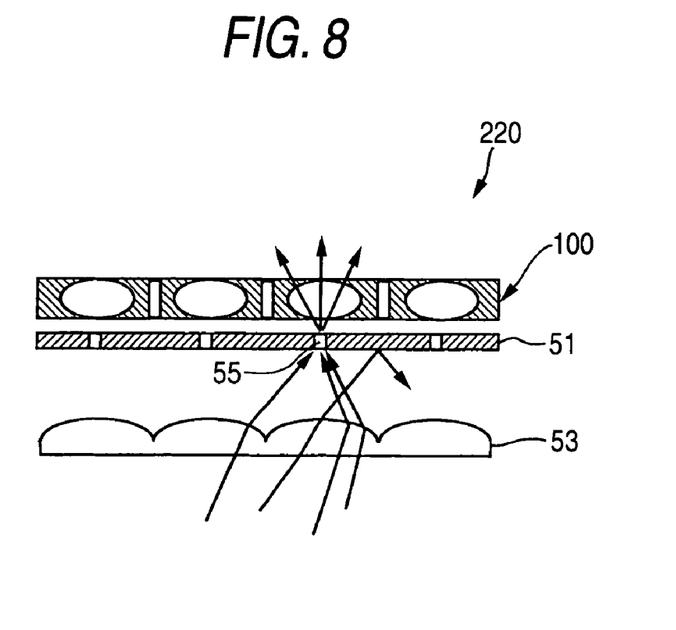
FIG. 8 is a schematic section view of a display device in which a slit panel and a microlens array are combinedly used.

FIG. 8 is a schematic section view of a display device in which a slit panel and a microlens array are combinedly used.

In the display device 220, the slit panel 51 and the microlens array 53 are placed in this sequence on the light incidence side of the light modulating elements 100, and light from a backlight which is not shown is incident on the slit panel 51 through the microlens array 53. Slits 55 which correspond respectively to the pixels of the light modulating elements 100 are formed in the slit panel 51. The incident light is converged by the microlens array 53 so as to be directed to the slits 55. Light which fails to enter the slits 55 in the first trial are reflected rearward or toward the backlight to be reused.

As a result of the use of the slit panel 51 and the microlens array 53, it is possible to obtain a light utilization efficiency which is particularly high.

Figure 9:
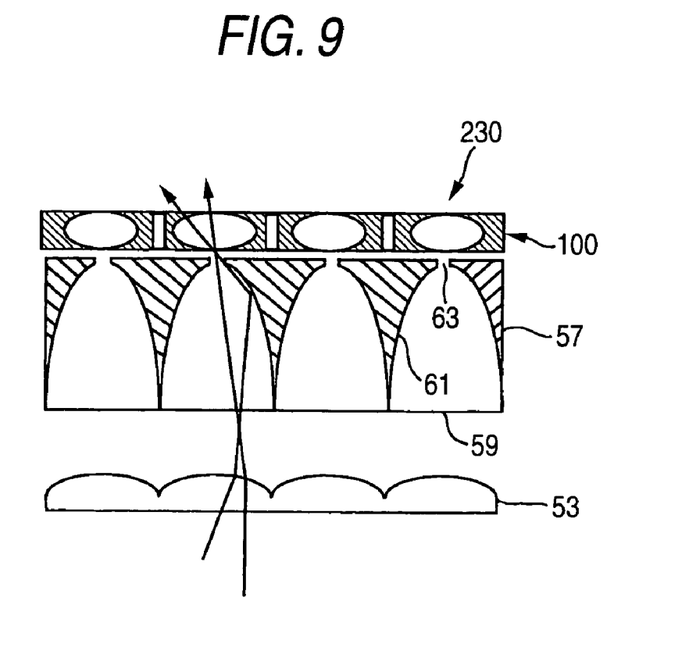
FIG. 9 is a schematic section view of a display device in which a panel having converging cavities, and a microlens array are combinedly used.

FIG. 9 is a schematic section view of a display device which is another example that can effectively use light, and in which a panel having converging cavities, and a microlens array are combinedly used.

In the display device 230, the panel 57 having converging cavities, and the microlens array 53 are placed in this sequence on the light incidence side of the light modulating elements 100, and light from a backlight which is not shown is incident on the cavities of the panel 57 through the microlens array 53.

The panel 57 has a plurality of converging cavities which are regularly distributed. An inlet hole 59 of each cavity is used for converging. An inner wall face 61 of each of the cavities defines an optical path so that light entering the cavity is directed toward an outlet hole 63. In order to minimize the attenuation of the amount of light which is caused by reflection, the inner wall face is covered with a highly reflective film of aluminum or the like. The outlet holes 63 are disposed so as to correspond respectively to the pixels of the light modulating elements 100.

In the display device 230, incident light converged by the microlens array 53 is introduced into each of the cavities of the panel 57. In the cavity, light is further converged to be directed to the outlet hole 63, and then emitted toward the light modulating element 100. According to the configuration, a higher light utilization efficiency can be attained, and display of high brightness can be efficiently performed.

In the above, display devices of the transmission type in which light from the backlight 27 is transmitted have been described. It is a matter of course that the invention is not restricted to a device of the transmission type, and may be applied also to devices of the semi-transmission type and the reflection type. In the case of the semi-transmission type or the reflection type, a light reflecting member such as a mirror or a white diffusion plate is disposed on the side of the back face of the light modulating element 100 or 110. According to the configuration, incident light from the front side can be effectively used so that a display can be performed at a high efficiency.

Figure 10A:
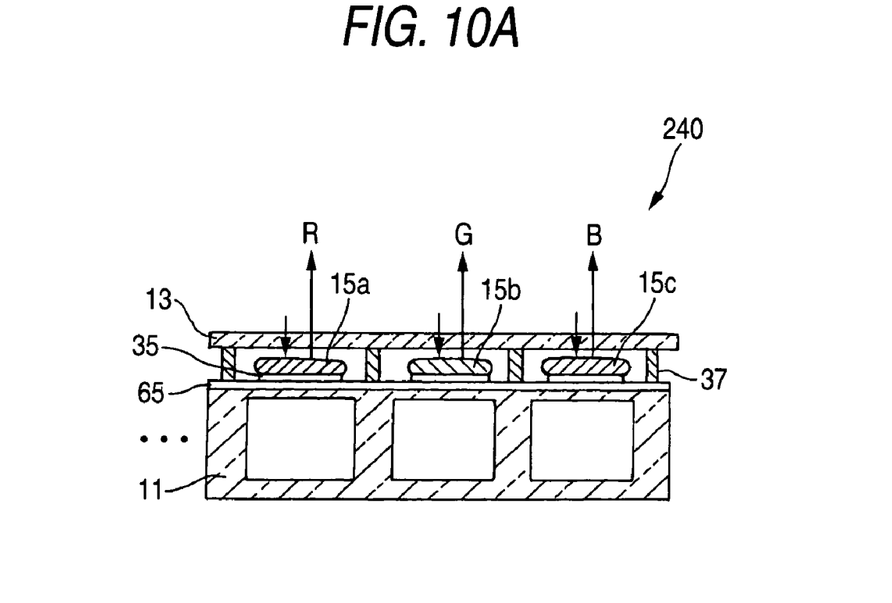
FIG. 10A is a section view of a color display device of the reflection type, showing configurations each corresponding to one pixel of a color display device.
Figure 10B:
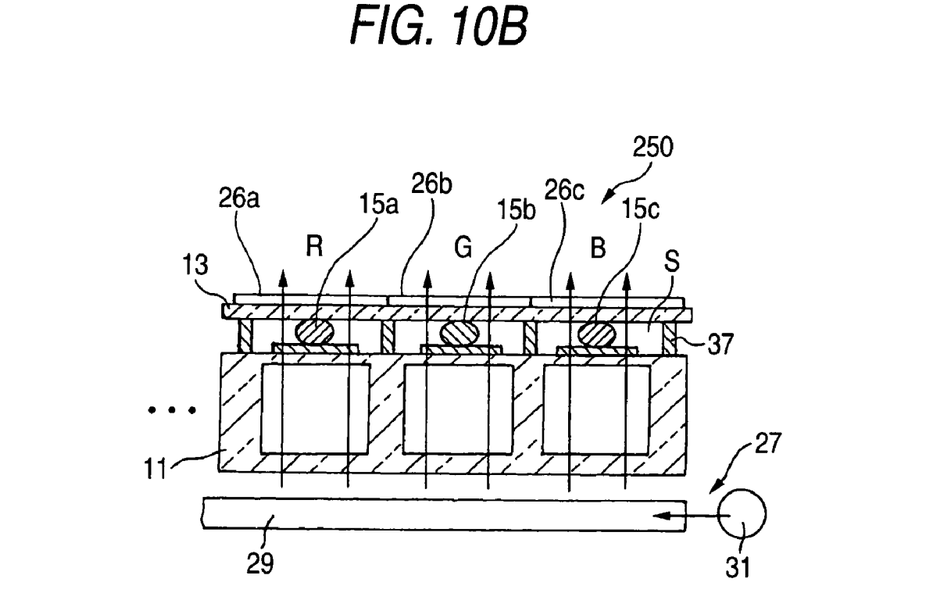
FIG. 10B is a section view of a color display device of the transmission type, showing configurations each corresponding to one pixel of a color display device.

An example in which the display device of the invention is configured as a color display device will be described.

FIGS. 10A and 10B show configurations each corresponding to one pixel of a color display device.

FIG. 10A shows a color display device 240 of the reflection type. A light absorption plate 65 is disposed on the face of the first substrate 11 on the display side. Colored fluids 15a, 15b, 15c of light modulating elements are colored in R (Red), G (Green), and B (Blue), respectively. When external light is incident on one of the colored fluids 15a, 15b, 15c, the display has the color of the colored fluid. By contrast, in the state where the colored fluid collects into a spherical shape, external light is incident mostly on the light absorption plate 65 to be absorbed thereby, with the result that a black display is obtained.

FIG. 10B shows a color display device 250 of the transmission type in which light diffusion plates 26a, 26b, 26c are light-transmittable color filters of R, G, B, respectively.

The color display device 240 shown in FIG. 10A is not restricted to the aforementioned configuration, and may be configured so that, in place of the light absorption plate 65 at the front of the first substrate 11, a light reflecting member such as a mirror or a white diffusion plate is disposed. In this case, the colored fluid 15 of black is used, and light-transmittable color filters of R, G, B are disposed for the light modulating elements, respectively. In place of the colored fluids 15 of R, G, B, colored fluids of Y (Yellow), M (Magenta), C (Cyan) may be used. In this case also, a color display can be efficiently performed.

As described above, according to the display device of the invention, the colored fluid is deformed in the sealed space to adjust surely and rapidly transmitted light or reflected light in the light modulating region. In comparison to a liquid crystal display device, an organic EL display device, an electrophoretic display device, and the like, therefore, the present display device can display an image of high brightness and excellent contrast at a wide viewing angle without producing color unevenness. Moreover, the production cost is low, and the power consumption can be reduced.

What is claimed is:

1. A display device comprising:
a plurality of light modulating elements being arranged in an array,
wherein an image is displayed by driving the light modulating elements; and
wherein each of the light modulating elements has:
a pair of substrates which are spaced apart from each other;
a fluid which is enclosed in a sealed space formed by a gap between the substrates; and
a driving section which deforms the fluid in the sealed space to control an area of the fluid in the sealed space, the area extending in a face of at least one of the substrates, thereby adjusting an amount of transmitted light or reflected light.

2. A display device according to claim 1, wherein the fluid is a magnetic fluid exhibiting magnetism, and the driving section includes a magnetic force generating section which generates a magnetic field in the sealed space to deform the fluid by means of a magnetic force.

3. A display device according to claim 1, wherein the driving section includes a piezoelectric member which is deformed by applying a voltage to change a thickness of the sealed space, thereby deforming the fluid.

4. A display device according to claim 1, wherein the fluid is a colored fluid containing a colored substance, and a transparent fluid which is nonmiscible in the colored fluid is enclosed in the sealed space.

5. A display device according to claim 1, wherein the fluid is a transparent fluid, and a colored fluid which is nonmiscible in the transparent fluid is enclosed in the sealed space.

6. A display device according to claim 4, wherein one or both of the colored fluid and the transparent fluid is a thixotropic fluid having a property that, in a quiescent state, the fluid is solidified in a gel state, and the fluid is set to a sol state by an external force to become fluent.

7. A display device according to claim 5, wherein one or both of the colored fluid and the transparent fluid is a thixotropic fluid having a property that, in a quiescent state, the fluid is solidified in a gel state, and the fluid is set to a sol state by an external force to become fluent.

8. A display device according to claim 1, wherein a backlight which emits light is disposed on a side of rear faces of the arranged light modulating elements.

9. A display device according to claim 1, wherein a reflection plate or a white diffusion plate which reflects light is disposed on a side of rear faces of the arranged light modulating elements.

10. A display device according to claim 8, wherein a microlens array is disposed between the light modulating elements and the backlight, the microlens array having a plurality of microlenses which converge light from the backlight to light modulating regions of the respective light modulating elements.

* * * * *